June 9, 1942.   W. C. NICHOLS ET AL   2,286,001
DEVICE TO PREVENT PICKING IN POULTRY
Filed May 24, 1940

INVENTORS:
William C. Nichols
BY Paul Mazur
ATTORNEY

Patented June 9, 1942

2,286,001

UNITED STATES PATENT OFFICE 2,286,001

DEVICE TO PREVENT PICKING IN POULTRY

William C. Nichols, Titusville, N. J., and Paul Mazur, New York, N. Y.; said Nichols assignor to said Mazur Application May 24, 1940, Serial No. 338,352

5 Claims. (Cl. 119—97)

This invention relates to a device adapted to be worn by fowl, and more particularly to a device adapted to be pulled through the breathing openings in the beak of a fowl for the purpose of preventing the fowl from fighting, picking, pulling the feathers, and to prevent cannibalism and related vices.

Poultrymen actually lose an appreciable number of fowl due to tendency of the fowl toward cannibalism, i. e. one or more fowl destroying another fowl by picking the organs of the fowl through the vent when the vent has been caused to bleed. The red color of the blood attracts the other fowl which proceed to pick at the vent with the result that the vital organs of the fowl are picked out causing the death of the fowl.

Many attempts have been made to provide a device which will prevent cannibalism of the fowl, feather pulling and the like. Some of these prior devices prevent the fowl from seeing directly ahead of it, while other devices comprise colored eye pieces of glass or film. Most of the prior devices are cumbersome and heavy. Our improved device consists of a single wire structure which is easy to apply and will not cause injury to the fowl.

Accordingly, it is an object of the invention to provide a device which may be readily applied to the beak of fowl such as chicken, turkeys or pheasants without causing injury to the fowl and which does not interfere with the fowl's breathing, eating or drinking and which effectively prevents the fowl from injuring or picking other fowl.

It is a further object of the invention to provide a very simple yet effective device of the kind described which consists of a single wire structure.

The above and other objects and advantages of this invention will be understood from the following detailed description of the present preferred embodiment, the same being illustrated in the accompanying drawing, wherein.

Figure 1:
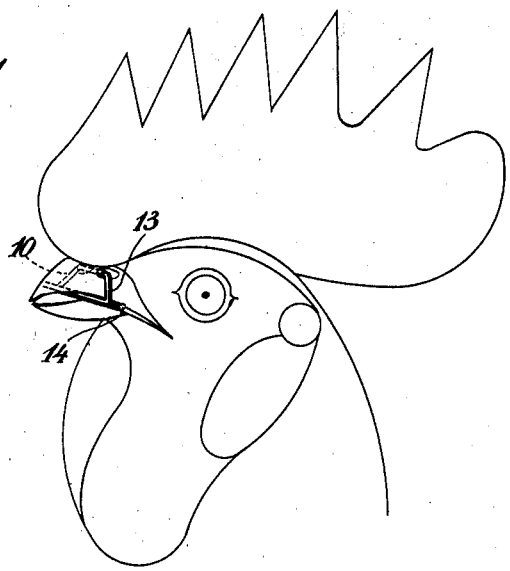
Fig. 1 is a perspective view of a device constructed according to the invention, showing the device applied to the beak of a fowl.
Figures 2, 3, 4:
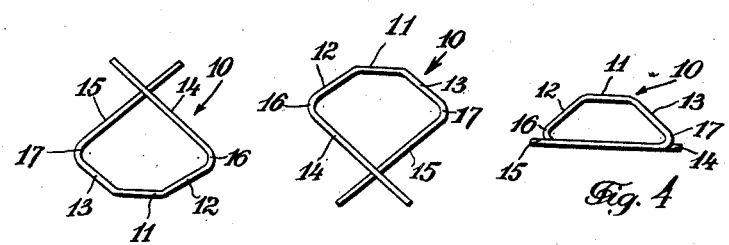
Fig. 2 is a plan view of our improved device shown in a position ready to be applied to the beak of a fowl.
Fig. 3 is a plan view similar to Fig. 2 showing the position of the device after being pulled through the nostrils of the fowl.
Fig. 4 is a plan view of the device with its free ends bent to provide a bit for the fowl.

Referring to the drawing, the numeral 10 generally designates the one-piece wire structure of our invention. The device consists of non-corrosive metal wire made of a special nickel-silver alloy. A non-corrosive flexible or elastic wire is particularly suited for this purpose. The wire 10 should be non-corrosive to prevent injury to the fowl. The wire 10 comprises a straight middle section 11, two adjacent intermediate sections 12 and 13, forming obtuse angles with section 11, and two free ends 14 and 15 forming acute angles with sections 12 and 13, respectively. The free end portions 14 and 15 are superimposed and make an acute angle with each other as shown in Figs. 2 and 3. Two curved middle sections 16 and 17 are respectively interposed between sections 12, 14 and sections 13, 15. The free end sections 14 and 15 should preferably be somewhat longer than the distance between rounded sections 16 and 17 for a purpose to be presently described.

The wire structure 10 as shown in Fig. 2 is in the correct position to be inserted through the nostrils of the fowl. One end section, e. g. the section 14, is inserted into one of the breathing openings in the beak of the fowl. Then the wire sections 16, 12 and 11 are successively pulled through the nostrils whereby the membrane separating the two nostrils is pierced by the free end 14. The device now has the position of Fig. 3, and the straight middle section 11 acts as a pivot to allow a free motion of the wire 10 in the mouth of the fowl. It is an important feature of the invention that the device has a free lateral motion which helps to keep the nostrils and the mouth of the fowl clean. Therefore, the distance between the curved sections 16 and 17 should be somewhat larger than the width of the beak of the fowl. The intermediate sections 12, 13 and the rounded sections 16, 17 are formed according to the shape of the upper mandible of the fowl. In the position of Fig. 3, the free ends 14 and 15 of wire structure 10 will protrude on both sides of the upper mandible.

The free ends 14 and 15 are now bent to the shape of Fig. 4. As will be seen from Fig. 4, the free ends 14 and 15 protrude a little distance over the rounded sections 17 and 16, respectively, to form a bit. Thus, the fowl is prevented from entirely closing the beak. It is another important feature of this invention that the free ends 14 and 15 may be used to adjust the wire 10 to the desired opening in accordance with the shape of the upper mandible of the fowl.

Furthermore, the free ends 14 and 15 serve to adjust the wire structure 10 to the growth of the beak of the fowl.

Extensive tests have shown that the wire structure 10 will not interfere with the feeding or drinking of the fowl and will at the same time safely prevent cannibalism of the birds. In view of the fact that the wire 10 has a certain freedom of movement in the mouth, our novel device will not create sore mouth and will not injure the nostrils of the birds.

Our novel device may be used continuously from the time of installation to the maturity of the birds. The device acts only on the hard bony surfaces of the upper edges of the lower mandible and on the lower edges of the upper mandible, and therefore any injury to the fowl is positively prevented. In fact, our device aids in the proper utilization of the food and improves the quality of the fowl.

We claim:

1. A device for preventing feather pulling in fowls comprising an integral wire piece made up into a loop-shaped upper mandible supported section and a transverse straight bit section, said bit section consisting of the two end portions of said wire having bends inwardly at acute angles from said loop-shaped section, said end portions extending over the width of the loop.

2. Device for preventing feather pulling in fowls comprising a continuous spring wire with its free ends crossed at an acute angle, and its body shaped to a loop having a substantially straight section disposed opposite to the point of intersection of said ends, said free ends extending over the width of said loop.

3. A device for preventing feather pulling in fowls comprising a continuous non-corrosive elastic wire shaped to present a loop having a straight transverse middle section and substantially straight legs acting as a bit, said legs consisting of the two end portions of said wire having bends to form acute angles with said loop, said legs being longer than the greatest width of said loop.

4. A device for preventing feather pulling in fowls comprising a continuous wire shaped to present an upper mandible supported arch-shaped body portion and a transverse straight bit section adapted in operative position to be situated between the upper and lower mandibles, said bit section consisting of the two free ends of the wire having bends inwardly from said body portion, the two ends of said bit section being spaced apart by more than the width of said arch-shaped body portion.

5. A device for preventing feather pulling in fowls comprising a continuous wire having an upper arch-shaped body portion and a transverse straight bit section situated between the upper and the lower mandibles, said arch-shaped body portion including two inclined side portions and a substantially straight connecting middle portion, the two side portions forming acute angles with the transverse bit section, the straight connecting middle portion extending through the full distance of the two nostrils of the fowl.

WILLIAM C. NICHOLS.
PAUL MAZUR.